Aug. 14, 1951 W. T. HAYDOCK 2,564,255
SEED SOWING DEVICE
Filed Aug. 22, 1947 3 Sheets-Sheet 1
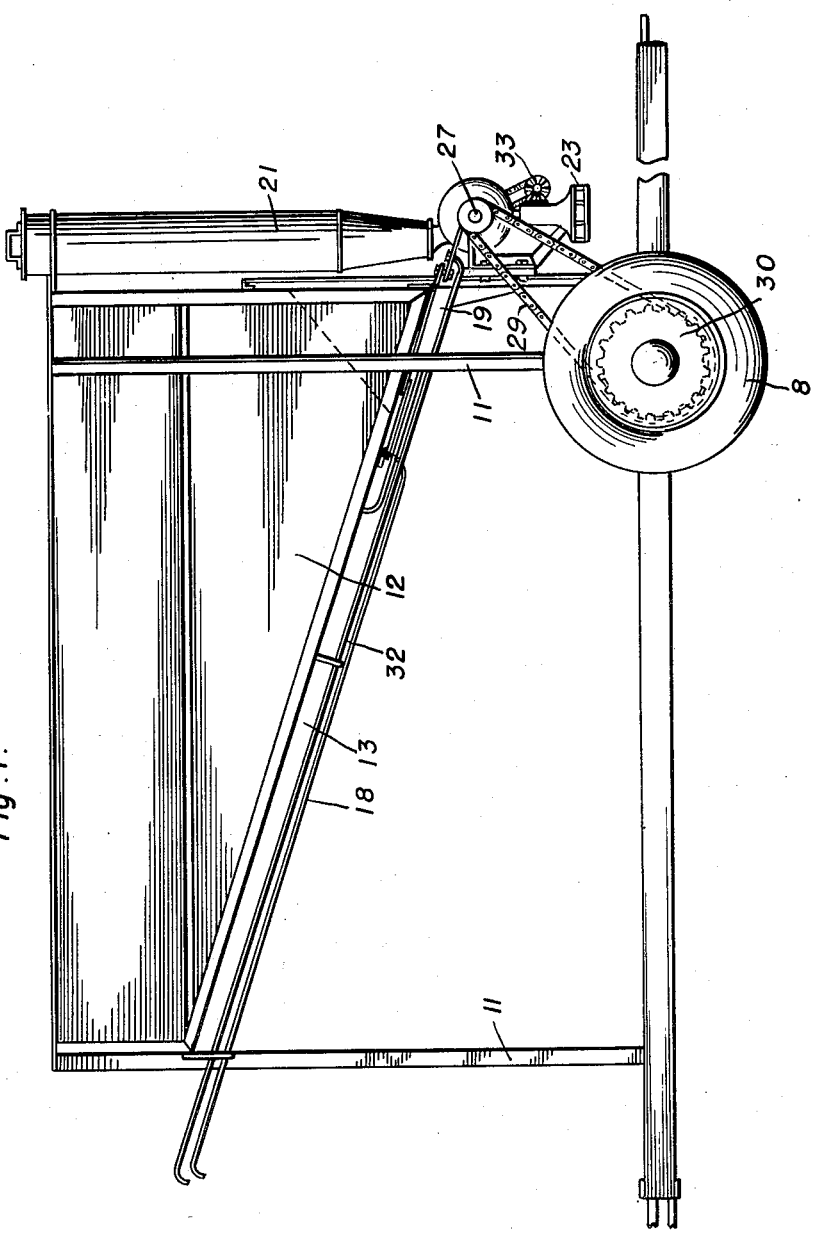
Fig. I.
Inventor
Jennie Haydock
EXECUTRIX OF THE ESTATE OF
William T. Haydock DECEASED
By Clarence A. O'Brien
and Harvey B. Jacobson
Attorne

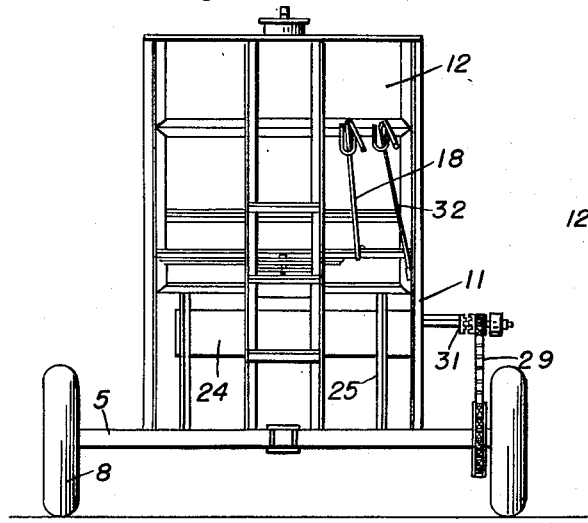
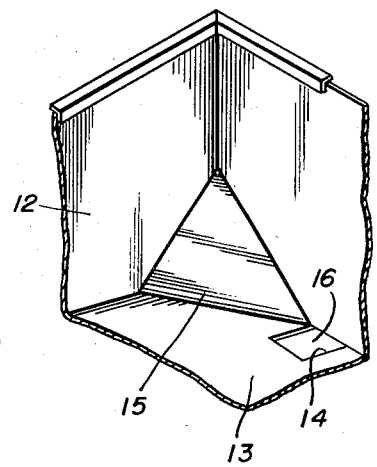
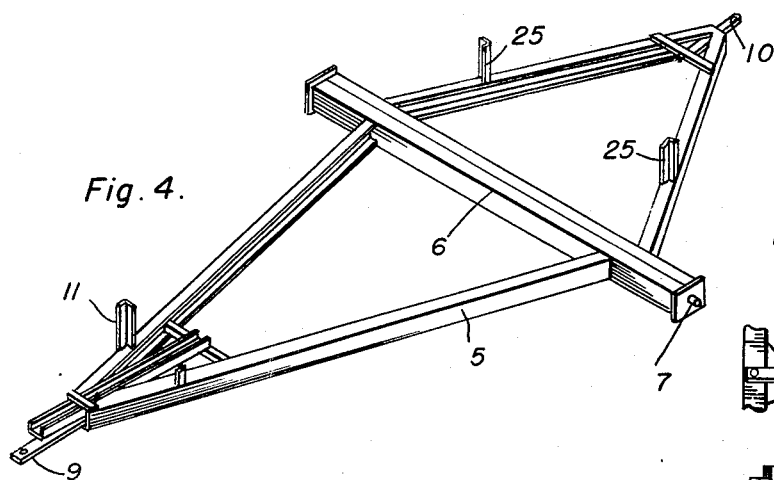
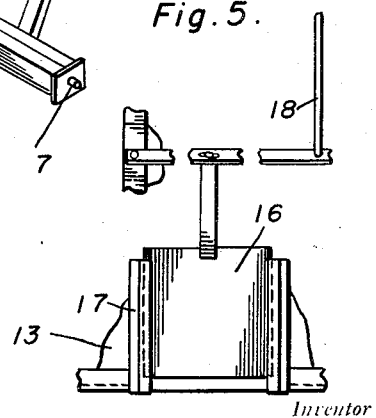
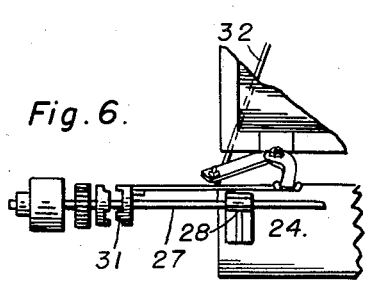
Inventor
Jennie Haydock
EXECUTRIX OF THE ESTATE OF
William T. Haydock DECEASED Aug. 14, 1951 W. T. HAYDOCK 2,564,255
SEED SOWING DEVICE
Filed Aug. 22, 1947 3 Sheets-Sheet 3
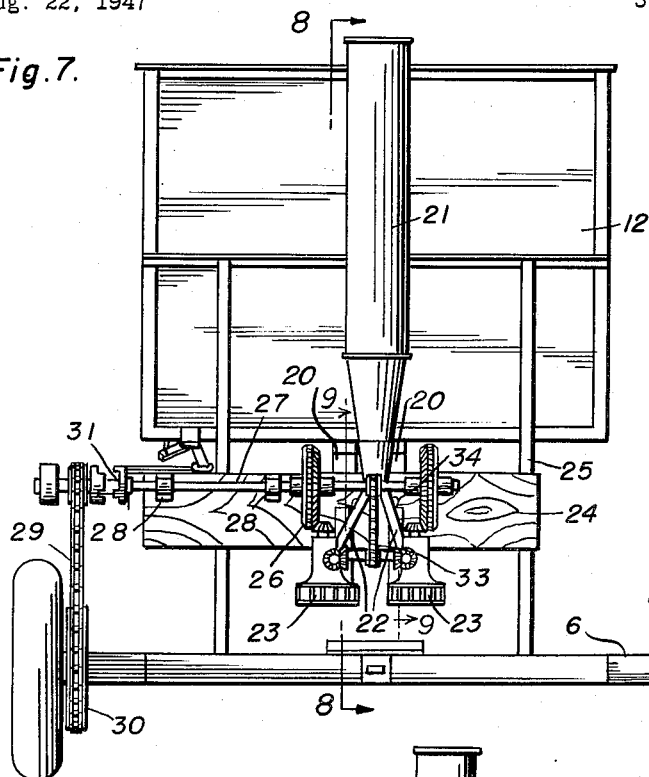
Fig. 7.
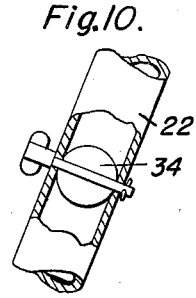
Fig. 10.
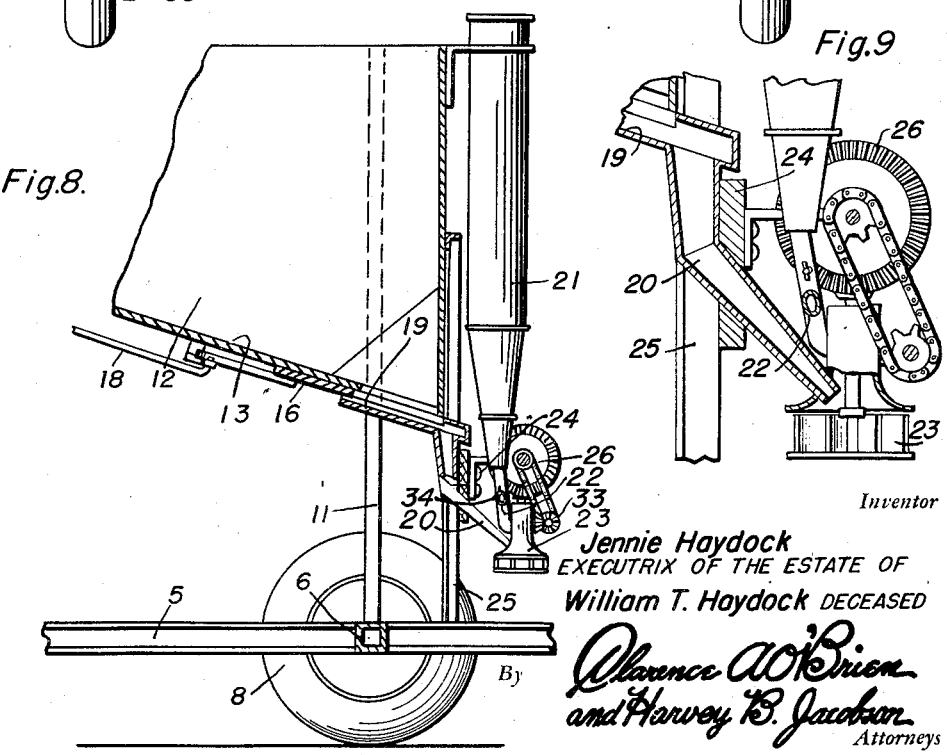
Fig. 8.
Fig. 9.
Inventor
Jennie Haydock
EXECUTRIX OF THE ESTATE OF
William T. Haydock DECEASED
By Clarence A. O'Brien
and Harvey B. Jacobson
Attorneys Patented Aug. 14, 1951

2,564,255

UNITED STATES PATENT OFFICE 2,564,255

SEED SOWING DEVICE

William T. Haydock, deceased, late of Hampton, Iowa, by Jennie Haydock, executrix, Hampton, Iowa Application August 22, 1947, Serial No. 770,133

2 Claims. (Cl. 275—8)

The present invention relates to new and useful improvements in seeders and more particularly to a seed sowing device for sowing two different types of seed simultaneously from the same seed scattering mechanism and under the control of the operator.

An important object of the invention is to provide a seeder for sowing oats, grain or the like together with grass seed and embodying a main hopper and an auxiliary hopper for the different seed and having chutes leading to the scatterer, and providing visual means for the chute of the main hopper to enable the operator to observe the feeding of the seed therefrom.

A further object is to provide a device of this character, of simple and practical construction, which is efficient and reliable in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a front elevational view.

Figure 3 is an enlarged fragmentary sectional view showing the discharge opening in the main hopper.

Figure 4 is a perspective view of the frame for the seeder.

Figure 5 is a detail of the gate for the discharge opening.

Figure 6 is a detail of the clutch for controlling the scatterer.

Figure 7 is a rear elevational view.

Figure 8 is a fragmentary sectional view taken on a line 8—8 of Figure 7.

Figure 9 is an enlarged vertical sectional view taken substantially on a line 9—9 of Figure 7; and Figure 10 is an enlarged fragmentary sectional view of one of the spouts showing the control valve therefor.

Referring now to the drawings in detail, wherein for the purpose of illustration there has been disclosed a preferred embodiment of the invention, the numeral 5 designates a substantially diamond-shaped vehicle frame having a transverse frame member 6 extending between its side corners and having axles 7 projecting therefrom for mounting a pair of wheels 8 on the axles.

The front and rear ends of the frame are provided with short tongues 9 and 10 for attaching to a tractor or the like (not shown) by a conventional hitch.

Posts 11 rise from the front and rear portions of the frame for supporting a main hopper 12 thereon, the hopper having an inclined bottom 13 to slope toward the rear end of the hopper.

A discharge opening 14 is formed in the bottom 13 at its rear end and the rear lower corners of the hopper are inclined as shown at 15 to prevent pocketing of seed therein. A door 16 is slidably mounted in guides 17 at the underside of the hopper to open and close the opening 14, and a handle or door operating rod 18 is connected at its rear end to the door and extends forwardly under the hopper and projects forwardly thereof for operation by the driver of a tractor drawing the seeder.

A chute 19 is positioned under the door 16 and opening 14, the chute being spaced below the door and is open at its front end to enable the driver to observe the feeding of the seed to the chute.

The chute slopes downwardly toward the rear and a pair of spouts 20 extend downwardly therefrom to a pair of seed scatterers 23 of a conventional type and which are rotatably mounted on a beam 24 which is supported by posts 25 at the rear of the frame. A vertical grass seed cylinder 21 also of a conventional type is suitably supported at the rear of hopper 12 and includes a pair of spouts 22 also leading to the scatterers 23. The scatterers are oppositely operated in the usual manner by gears 26 driven by a transverse shaft 27 journaled in bearings 28 and having a chain and sprocket drive 29 from a sprocket 30 carried by one of the wheels. A conventional clutch device 31 controls the operation of the shaft and is operated by a second rod 32 which also extends forwardly under the main hopper to a position for operation by the driver.

In the operation of the device oats or other seed grain is placed in the hopper 12 and grass seed placed in cylinder 21, the seed from the hopper being delivered to the chute 19 and spouts 20 to the scatterers together with a desired proportion of seed from the cylinder 21 and spouts 22 to be simultaneously sowed. Control valves for regulating the flow of seed from hopper 21 to each scatterer are provided in spouts 22, as shown at 34.

Having thus described the invention, what is claimed as new is:

1. A seeder comprising a frame, wheels supporting the frame, a main seed hopper supported on the frame and having a rearwardly sloping bottom, said hopper having a discharge opening in its bottom at its rear lowermost end, a rotary scatterer operatively mounted at the rear of the hopper, a chute leading from the opening to the scatterer, said chute having an open front end for observing the feeding of seed to the scatterer by the driver of a towing vehicle, a sliding door in the chute for the opening, and an operating handle for the door extending forwardly through the open end of the chute to the front of the main hopper.

2. A seeder comprising a frame, wheels supporting the frame, a main seed hopper supported on the frame and having a rearwardly sloping bottom, said hopper having a discharge opening in its bottom at its rear lowermost end, a second hopper supported at the rear of the first named hopper, a rotary scatterer operatively mounted at the rear of the frame, a chute leading from the discharge opening of the first hopper, a spout leading from the chute to the scatterer, a spout leading from the second hopper to the scatterer, said chute having an open front end for observing the feeding of seed to the scatterer from the first hopper by the driver of a towing vehicle, a sliding door in the chute for the opening and an operating handle for the door extending forwardly through the open end of the chute to the front of the first-named hopper.

JENNIE HAYDOCK,
*Executrix of the Estate of William T. Haydock, Deceased.*

REFERENCES CITED

The following references are of record in the file of this patent:

UNITED STATES PATENTS

| Number | Name | Date |
|---|---|---|
| 21,995 | Walton | Nov. 2, 1858 |
| 35,438 | Field | June 3, 1862 |
| 198,037 | Miller et al. | Dec. 11, 1877 |
| 253,285 | Henris | Feb. 7, 1882 |
| 1,178,506 | Fennel | Apr. 11, 1916 |
| 1,776,751 | Ditto | Sept. 23, 1930 |
| 1,912,172 | Bailey | May 30, 1933 |
| 1,965,483 | Woods | July 3, 1934 |
| 2,060,652 | Arnold | Nov. 10, 1936 |
| 2,334,376 | Bauer | Nov. 16, 1943 |
| 2,521,565 | Carelock | Sept. 5, 1950 |